UNITED STATES PATENT OFFICE.

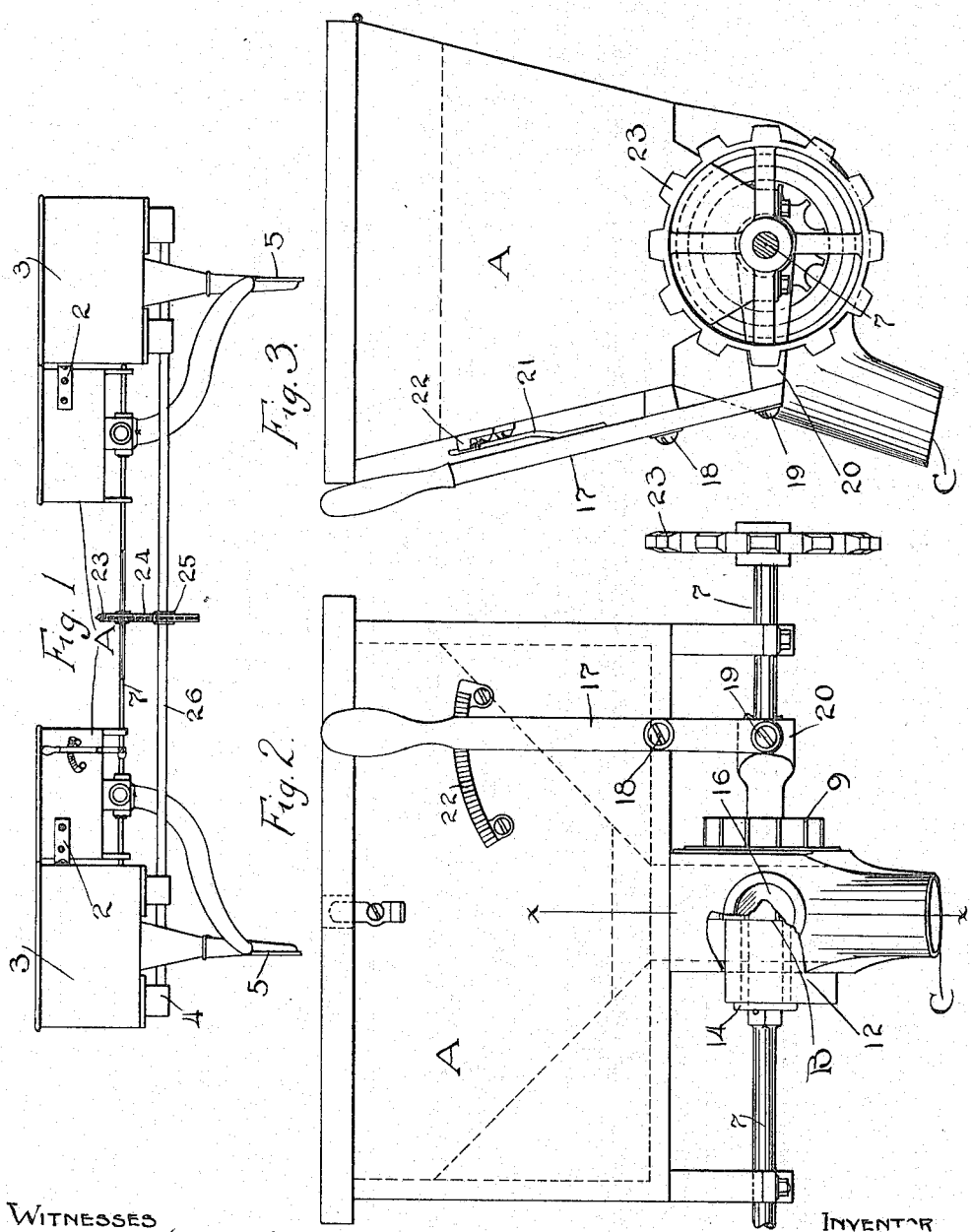

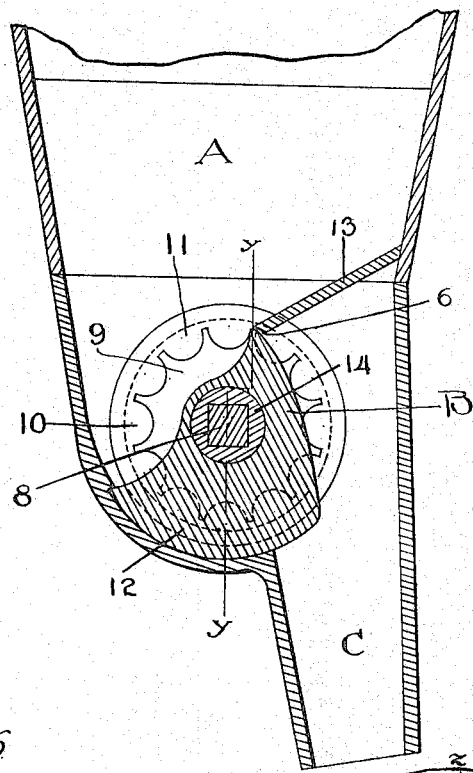
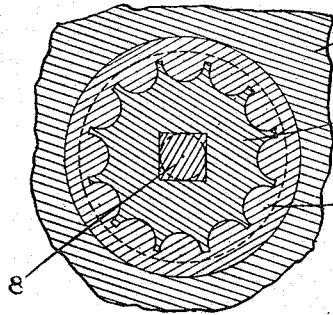
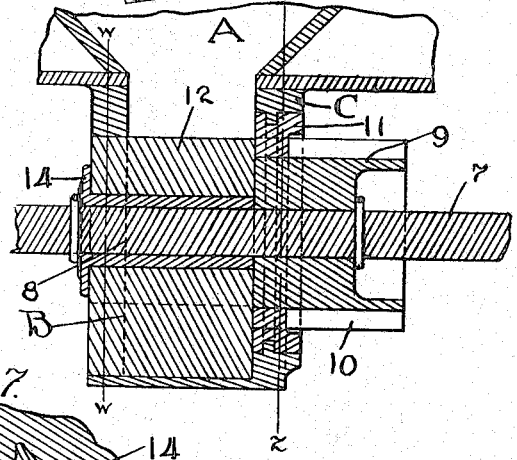
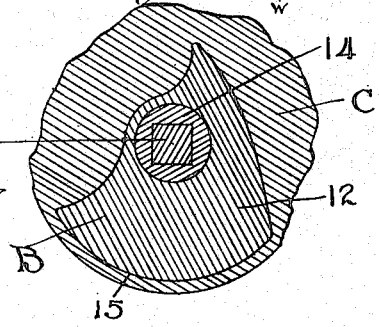

JOHN C. UNZELMAN, OF MADISON, SOUTH DAKOTA.

SEED-DRILL.

1,129,823. Specification of Letters Patent. Patented Feb. 23, 1915.

Application filed April 23, 1913. Serial No. 763,086.

*To all whom it may concern:*

Be it known that I, JOHN C. UNZELMAN, a citizen of the United States, residing at Madison, in the county of Lake and State of South Dakota, have invented certain new and useful Improvements in Seed-Drills, of which the following is a specification.

My invention relates to improvements in drills designed particularly for sowing alfalfa, onion, or other small seeds in rows, or the device may be fastened to a corn planter and used in connection with a check wire to allow the seed to be planted in hills.

To this end the invention consists in the features of construction, combination, and arrangement of parts hereinafter described and claimed.

In the accompanying drawings forming part of this specification, Figure 1 represents a rear view of a corn planter showing my invention in coöperation therewith; Fig. 2 is a rear view of a left hand hopper; Fig. 3 is a side view of the hopper shown in Fig. 2; Fig. 4 is a section on line $x$—$x$ of Fig. 2; Fig. 5 is a section on line $y$—$y$ of Fig. 4; and Fig. 6 is a section on line $z$—$z$ of Fig. 5. Fig. 7 is a section on line $w$—$w$ of Fig. 5.

Referring to the drawings, A represents a pair of my improved feed regulating hoppers supported by brackets 2 upon the inner sides of the hoppers 3 of an ordinary corn planter, the whole being supported upon the framework 4.

5 represents the ordinary shoes extending downwardly and forwardly from the corn hoppers.

Each hopper A is formed with a feeding spout C extending downwardly and outwardly to the shoe 5. Slidable in the opening 6 forming the top of the spout is the regulating valve B. The regulating valves for the two spouts are mounted upon a slidable connecting shaft 7. The slidable shaft 7 in passing through each valve is formed with a squared portion 8. Each regulating valve is formed with a section 9 secured upon the squared portion of the shaft and of less diameter than the width of the opening 6, said section being formed in its periphery with a plurality of longitudinally extending pockets 10. The section 9 is slidably fitted within a collar 11, said collar being rotatable in the corresponding side wall of the spout.

Mounted upon the shaft at one side of each section 9 is an irregular shaped section 12. The section 12, as shown, forms a closure for the opening 6 from the front wall to the rearwardly extending inclined wall 13, said section being cut away on its front and rear sides to bring its upper portion to a relatively thin edge, and the inclined wall extending from said edge to the hopper wall. The shaft is rotatable within the section 12 through the medium of the collar 14, which is secured upon the shaft and extends rotatably through the section 12. The section 12 itself is kept from rotating by extending through a correspondingly shaped opening 15 in the corresponding side wall of the spout. The back of the spout is preferably formed with a sight glass 16.

The shaft 7 is longitudinally slidable by means of the handle 17 having fulcrum support 18 upon the rear side of the hopper and at its lower end having pivotal connection 19 with an arm 20 extending rearwardly from the shaft. The handle 17 at its free end carries a spring 21 working in connection with a toothed bar 22. The shaft 7 slidably supports, as by being squared, a sprocket wheel 23 connected by a chain 24 with a similar wheel 25 carried by an actuating axle 26. Each hopper is provided with a suitable cover.

In use, the section 9 of the valve constitutes a feed valve section and the section 12 a coöperating shut off valve. By sliding the shaft 7 through the medium of the handle 17, the valves B are regulated so that either section 9 or 12, as desired, will partially or wholly extend across the opening 6. Where the maximum feed is desired, the shaft will be adjusted to the left to carry the cut off sections 12 out of the spout openings and cause the feed sections or wheels 9 to stand within the spout opening. The rotation of the shaft 7 will then, through the medium of the pockets 10 bring about the maximum feed. Where it is desired to cut down the feed, moving of the shaft 7 to the right will carry the feed sections 9 out of the spout openings and correspondingly carry the cut off sections 12 into the spout openings. Thus in cutting down the feed, the feed section 9 and the cut off section 12 will each stand extending partly into the opening, and where it is desired to entirely cut off the feed, the feed section will be carried entirely out of the spout opening, bringing the cut off section entirely into the opening, to shut off the feed.

I claim as my invention:

An apparatus of the class described comprising, a hopper, a spout leading therefrom, a valve positioned between said hopper and spout, said valve consisting of a slidable rotatable regulating member formed in its periphery with a plurality of depressions, a non-rotatable slidable cut off section positioned alongside said regulating section, said section being cut away on its front and rear sides to bring its upper portion to a relatively thin edge substantially as shown, and an inclined wall 13 extending from the relatively thin upper edge of said section to an adjacent hopper wall.

In testimony whereof I affix my signature in presence of two witnesses.

JOHN C. UNZELMAN.

Witnesses:
H. H. HOLDRIDGE,
JACOB KUNELOT.

Copies of this patent may be obtained for five cents each, by addressing the "Commissioner of Patents, Washington, D. C."